United States Patent
Mattathil

(10) Patent No.: US 6,674,749 B1
(45) Date of Patent: Jan. 6, 2004

(54) BANDWIDTH TRANSFER SWITCHING SYSTEM

(76) Inventor: George Mattathil, P.O. Box 2264, Cupertino, CA (US) 95015-2264

( * ) Notice: Subject to any disclaimer, the term of this patent is extended or adjusted under 35 U.S.C. 154(b) by 0 days.

(21) Appl. No.: 09/622,252

(22) PCT Filed: Jan. 14, 2000

(86) PCT No.: PCT/US00/01039
§ 371 (c)(1),
(2), (4) Date: Jan. 4, 2002

(87) PCT Pub. No.: WO00/42750
PCT Pub. Date: Jul. 20, 2000

Related U.S. Application Data

(60) Provisional application No. 60/116,008, filed on Jan. 15, 1999.

(51) Int. Cl.[7] .............................. H04L 12/66
(52) U.S. Cl. .................. 370/353; 370/354; 370/355; 370/356
(58) Field of Search .................. 370/352–356, 370/395.41, 395.5–395.53, 359, 463, 468–469

(56) References Cited

U.S. PATENT DOCUMENTS

| | | | |
|---|---|---|---|
| 5,737,320 A | | 4/1998 | Madonna .................. 370/258 |
| 5,946,323 A | * | 8/1999 | Eakins et al. ............... 370/468 |
| 5,954,799 A | * | 9/1999 | Goheen et al. ............. 709/250 |
| 5,991,293 A | | 11/1999 | Buchanan et al. .......... 370/353 |
| 6,026,086 A | | 2/2000 | Lancelot et al. ............ 370/353 |
| 6,243,377 B1 | * | 6/2001 | Phillips et al. ............. 370/354 |
| 6,246,679 B1 | * | 6/2001 | Yamamoto ................. 370/352 |
| 6,289,097 B1 | * | 9/2001 | Gregory et al. ............ 379/338 |
| 6,343,074 B1 | * | 1/2002 | Pickett ..................... 370/353 |
| 2001/0055299 A1 | * | 12/2001 | Kelly ........................ 370/352 |

* cited by examiner

Primary Examiner—Chi Pham
Assistant Examiner—Thai D Hoang
(74) Attorney, Agent, or Firm—Raymond E. Roberts; IPLO Intellectual Property Law Offices

(57) ABSTRACT

A bandwidth transfer switching system (100) connecting various customer devices (12a–g), including local area networks (44), from customer premises (42) through a local loop (50) to a telco central office (50), to deliver switched circuit traffic to central office switches (60) and data packet traffic to wide area networks (64), such as the Internet. Access concentrators (104, 140) are employed at the customer premises (42), remote concentrators (106, 140) and optional relay nodes (160, 140) are employed in the local loop (50), and transfer switches (108, 140) are employed in the central office (56). Copper wire lines (166) and fiber optic lines (168) are used to handle typical protocols such as POTS, E1/T1/xDSL, and SONET between the various transfer nodes (140).

22 Claims, 14 Drawing Sheets

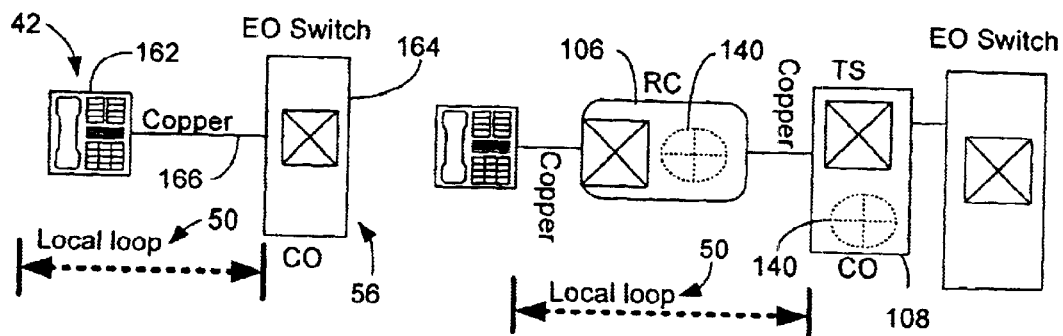
FIG. 15a
FIG. 15b
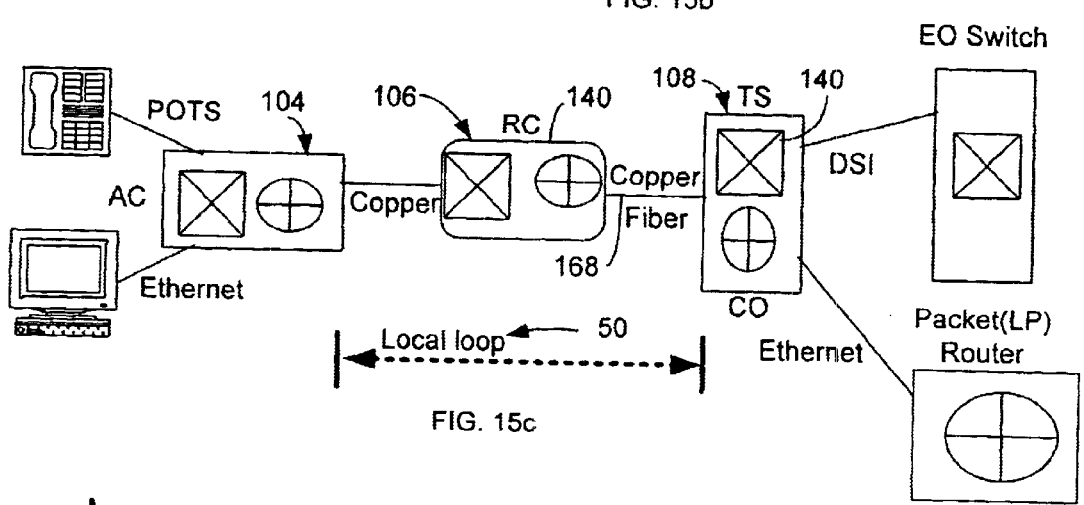
FIG. 15c
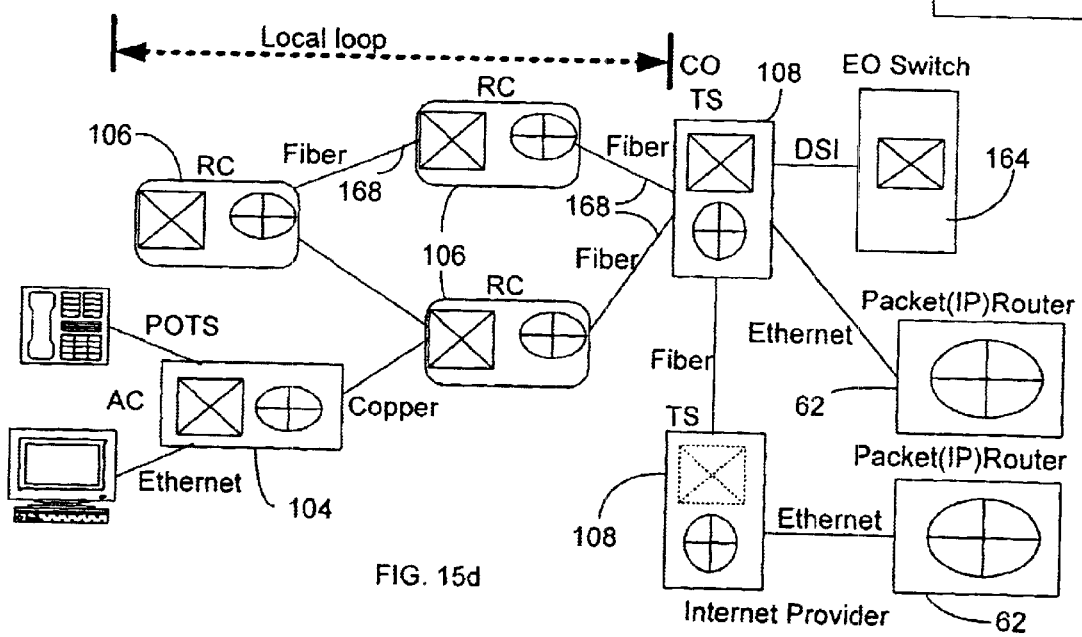
FIG. 15d
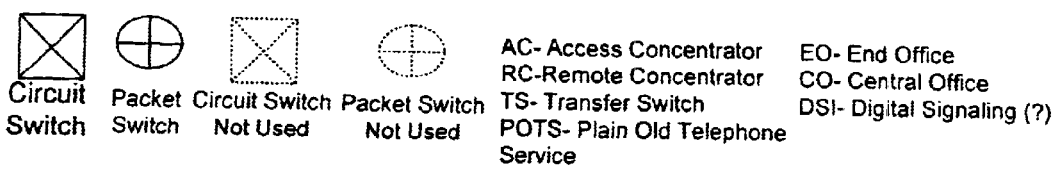

BANDWIDTH TRANSFER SWITCHING SYSTEM

This Application claims the Benefit of Provisional Application Ser. No. 60/116,008 Filed Jan. 15, 1999.

TECHNICAL FIELD

The present invention relates generally to telecommunications, and more particularly to network communications over public telephone switching systems.

BACKGROUND ART

FIG. 1 (background art) is a block diagram depicting the existing infrastructure 10 of the public switched telephone network (PSTN). Various devices may communicate via the existing infrastructure 10, and users today often have and use multiple such devices. In FIG. 1 a telephone 12a, facsimile 12b, modem 12c, computer 12d, and special service device 12e are shown connected to a PSTN 14 and another telephone 12a, facsimile 12b, modem 12c, computer 12d, and special service device 12e are shown also connected to the PSTN 14. The telephones 12a and facsimiles 12b are analog type devices which may communicate with respective like devices. In FIG. 1 the modems 12c stylistically depict the still common situation of digital devices (not shown) producing digital signals that are converted to and from analog type signals, but otherwise communicating using analog techniques. In contrast, the computers 12d and special service devices 12e shown here stylistically depict true digital type devices.

While the presence of computers 12d in the existing infrastructure 10 is relatively well known, some readers may not be familiar with the special service devices 12e. These are relatively common today, but little appreciated. Some examples include remote monitor able utility meters and alarm systems. Such special service devices 12e typically require a much lower data transfer rate than systems like the computers 12d.

For communications between the respective sets of like devices, the analog "traffic" may be entirely via the PSTN 14. In contrast, the digital traffic for the computers 12d may start on the PSTN 14 and then proceed via an Internet protocol network (IP network 18). Similarly, the digital traffic for the special service device 12e may start on the PSTN 14 and then proceed via a signal switching network, like the SS7 network 20 shown.

FIG. 2 (background art) is a block diagram depicting the most common digital, or "Internet call," connection methodology. Digital devices (not shown here) produce digital signals which the modems 12c convert to analog type signals. The modems 12c connect to ingress switches 22 via conventional voice circuits or (commonly) plain old telephone service lines (POTS lines 24). The ingress switches 22 may connect directly to an egress switch 26, via POTS lines 24, or to a tandem switch 28 that further connects to the egress switch 26 via an interoffice trunk 30. The egress switch 26 is connected to an Internet service provider point-of-presence (ISP POP 32) via POTS lines 24. Often the ISPs will have multiple POTS lines 24 or ISDN primary rate interface configured into hunt groups, and this is the case depicted in FIG. 2. Finally, the ISP POP 32 connects to the IP network 18. Of course, digital communications going the other direction travel essentially the reverse path.

FIG. 3 (prior art) is a block diagram depicting the presently popular network evolution model, wherein the IP network 18 evolves to become a single common packet backbone. Analog devices like telephones 12a and facsimiles 12b (FIG. 1) have their signals converted to digital data packets. The same can be done for the analog output of modems 12c (FIG. 1), but would generally be pointless. Existing digital devices like the computers 12d would continue to connect to the IP network 18, and the special service devices 12e would evolve into types that could also connect to the IP network 18. New digital audio-video devices, like digital voice phones 12f and video units 12g (e.g., cameras, or "CAMs" as they are often termed in the industry) can similarly connect directly to the IP network 18. Unfortunately, there are problems with this evolution model. In particular, and as discussed more extensively elsewhere herein, it obsoletes the current investment in PSTN technology and it introduces a number of transitional technical problems.

FIG. 4 is a block diagram depicting a more suitable network evolution model. The various communications devices (12a–g) connect to an access network 34, and the access network 34 connects to the PSTN 14 (essentially the major central element already in the existing infrastructure 10), the IP network 18, the SS7 network 20 and also a broadband network 36. The IP network 18 can handle most existing bandwidth digital communications, and the broadband network 36 can handle high bandwidth communications such as digital video. Under this alternate network evolution model the broadband network 36 would initially be optional, and only added as needed.

FIG. 5 (background art) is a block diagram of a conventional current digital loop carrier communications architecture (DLC architecture 40). At a customer premises 42 a LAN 44 includes network devices 46 and what will here be termed customer premises equipment (CPE 48; such as a channel service unit/data service unit, analog/ISDN/xDSL type modems etc.). The customer premises 42 may also include plain old telephone service (POTS) devices, such as the telephone 12a which is shown.

The next segment in the communications architecture is the local loop 50. It primarily includes a remote terminal 52. Connecting digital traffic from the CPE 48 to the remote terminal 52 is one or more T1/E1/DSx lines 54 (which here may generically include all digital "copper wire" protocols as well, e.g., xDSL and ISDN). Carrying analog (e.g., voice, facsimile, and modem) POTS traffic to the remote terminal 52 are one or more POTS lines 24. A plurality of such customer premises 42 is typically serviced by each remote terminal 52.

Following this in the communications architecture is the central office 56, which includes a central office terminal 58 that connects to a central office switch 60 (larger central offices typically include multiple central office terminals 58 and multiple central office switches 60, and central offices may even have remote terminals 52 directly connected into the central office switches 60). Optionally, Internet routers 62 from Internet service providers (ISP's), may also be connected to the central office switch 60.

For simplicity in discussion, the Internet is used as a generic example of a specialized application network here, but it should be appreciated that many other examples exist. Alarm systems and video conferencing networks are two common ones, and ones which might respectively use the SS7 network 20 (FIGS. 1 and 4) and the broadband network 36 (FIG. 4). For convenience in discussion, such dispersed networks that operate through, or in some segments parallel to, the public telephone switching system are herein termed wide area networks (WAN 64).

Continuing with FIG. 5 (background art), a plurality of local loops 50 are typically serviced by each central office terminal 58, and a plurality of specialized networks devices (e.g., Internet routers 62) may be serviced by each central office switch 60. Today, the remote terminal 52 to central office terminal 58, the central office terminal 58 to central office switch 60, and the central office switch 60 to Internet router 62 connections are typically all also T1/E1/DSx lines 54. FIG. 5 includes the specialized network example of an ISP's Internet routers 62 in turn connected to other devices (not shown) by a 10/100/1000 base-T line in the WAN 64. This example presumes the modern practice of directly connecting specialized network devices directly to the central office switch 60 with T1/E1/DSx lines 54. Older installations, smaller ISP's, and other specialized networks may still employ modem banks.

Within this conventional architecture, the recent approach to increasing switching system bandwidth has been development of new technologies. One example is digital subscriber line (xDSL). It increases existing copper wire bandwidth, but by adding yet another set of protocols. It also address the problem in only one segment of the communications architecture, the customer premises 42 to local loop 50 segment, thus making it a stratified approach. This approach uses asynchronous transfer mode (ATM), which requires new hardware throughout the entire communications architecture, and is therefore not a stratified approach. ATM also requires fixed length packets, which is not always efficient when dealing with a variety of data types. ATM may hold great promise for the ultimate future, but it is definitely not an interim or inexpensive solution.

FIGS. 6a–b (prior art) are block diagrams of a current digital subscriber line (xDSL) architecture, wherein FIG. 6a depicts the hardware architecture and FIG. 6b depicts the software architecture. In FIG. 6a, at the customer premises 42 a computer 12d employs an ATM transmission unit— remote (ATU-R 66) to connect via an xDSL interface 68 to an ATU—central (ATU-C 70) in a DSL access multiplexer (DSLAM 72) at the telco central office 56. Further connection is then made via an asynchronous transfer mode network (ATM 74) to a broadband access server (BAS 76) at a network service provider 78. In FIG. 6b, at the customer premises 42 a network protocol 80, point-to-point protocol 82, an ATM adaptation layer (AAL5 84), ATM protocol 86, and asynchronous DSL protocol (ADSL protocol 88) are employed. At the central office 56, the ATM protocol 86 and the ADSL protocol 88 are employed along with a physical protocol 90. At the network service provider 78, another (layer) physical protocol 90, ATM protocol 86, AAL5 84, point-to-point protocol 82, and a network protocol 80 are employed. Some of these layers may be the same and some may be different. For example, the physical protocols 90 usually must be the same on adjacent nodes, and the network protocols 80 usually are the same correspondent nodes.

In summary, the communications architecture used today is quite complex, and getting more so. A myriad of different networks and protocols is already in use, with some being gradually grand-fathered out and emerging new ones growing in importance. It is simply not realistic to expect that old systems will be instantaneously replaced with new ones, and it follows that what is needed are systems for graceful upgrade. Such systems should permit incorporation of both the existing systems and those which are emerging and even yet to be developed.

DISCLOSURE OF INVENTION

Accordingly, it is an object of the present invention to provide a system to upgrade existing public switched telephone network (PSTN) systems to additionally handle packet transfer communications traffic.

Another object of the invention is to provide a system for reducing or eliminating local loop bottlenecks in existing PSTN systems without resorting to parallel packet switching networks.

And another object of the invention is to provide efficient high-bandwidth packet transfer public networks leveraging much of the existing PSTN infrastructure and investment.

Briefly, one preferred embodiment of the present invention is an improved communications system of the type in which a public switched telephone network (PSTN) has both circuit switched and packet transfer communications device types at various customer premises connected through at least one telco central office. The improvement includes an access network having an access concentrator located at a customer premises, a remote concentrator located between the customer premises and the telco central office, and a transfer switch located at the telco central office. The access concentrator accepts both the switched signals packet signals from the communications devices and communicates them as a terminating node signal over a internal interface to a remote concentrator. The remote concentrator accepts the terminating node signal from the access concentrator and communicates it as a distributor node signal over another internal interface to the transfer switch. The transfer switch accepts the distributor node signal from the remote concentrator and separates the switched signals and the packet signals from the distributor node signal. The transfer switch then transmits the switched signals onward to their ultimate intended circuit switched type communications devices. And the transfer switch also routes the packet signals onward to their ultimate intended packet transfer type communications devices.

An advantage of the present invention is that it permits efficient, and therefore highly economical, integration of both circuit switched and packet transferred network traffic onto a network backbone based around the existing PSTN system.

Another advantage of the invention is that it permits packet transferred network traffic to be particularly efficiently sent by employing spoofing of network control packages, e.g., media access control (MAC) addresses, across the local loop of the communications network and thus reduce or eliminate the need to transfer this information.

Another advantage of the invention is that it integrates existing and emerging analog and digital systems for computer and other data, voice, and video.

And, another advantage of the invention is that it reduces peripheral communications problems like the current IP address shortage, network security, unifying directory services, and providing additional number services in our finite numbering schemes.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIGS. 6a–b (prior art) are block diagrams of a current digital subscriber line (xDSL) architecture, wherein FIG. 6a depicts the hardware architecture and FIG. 6b depicts the software architecture;

FIGS. 12a–b are block diagrams depicting a metropolitan area implementation suitable for use within the present invention, wherein FIG. 12a depicts equipment connections and FIG. 12b conceptually depicts transfer node connection with protocol layering;

FIGS. 13a–b are block diagrams depicting a suburban area implementation suitable for use within the present invention, wherein FIG. 13a depicts equipment connections and FIG. 13b conceptually depicts transfer node connection with protocol layering;

FIGS. 14a–b are block diagrams depicting a rural area implementation suitable for use within the present invention, wherein FIG. 14a depicts equipment connections and FIG. 15b conceptually depicts transfer node connection with protocol layering; and FIGS. 15a–d are block diagrams illustrating how invention permits enhancing and upgrading public switched telephone networks in stages, wherein FIG. 15a shows the existing network, FIG. 15b shows adding centralized transfer nodes, FIG. 15c shows adding customer site transfer nodes and replacing copper interfaces with fiber optic ones, and FIG. 15d shows adding further centralized transfer nodes, particularly to provide high bandwidth capabilities.

BEST MODE FOR CARRYING OUT THE INVENTION

Figure 1:
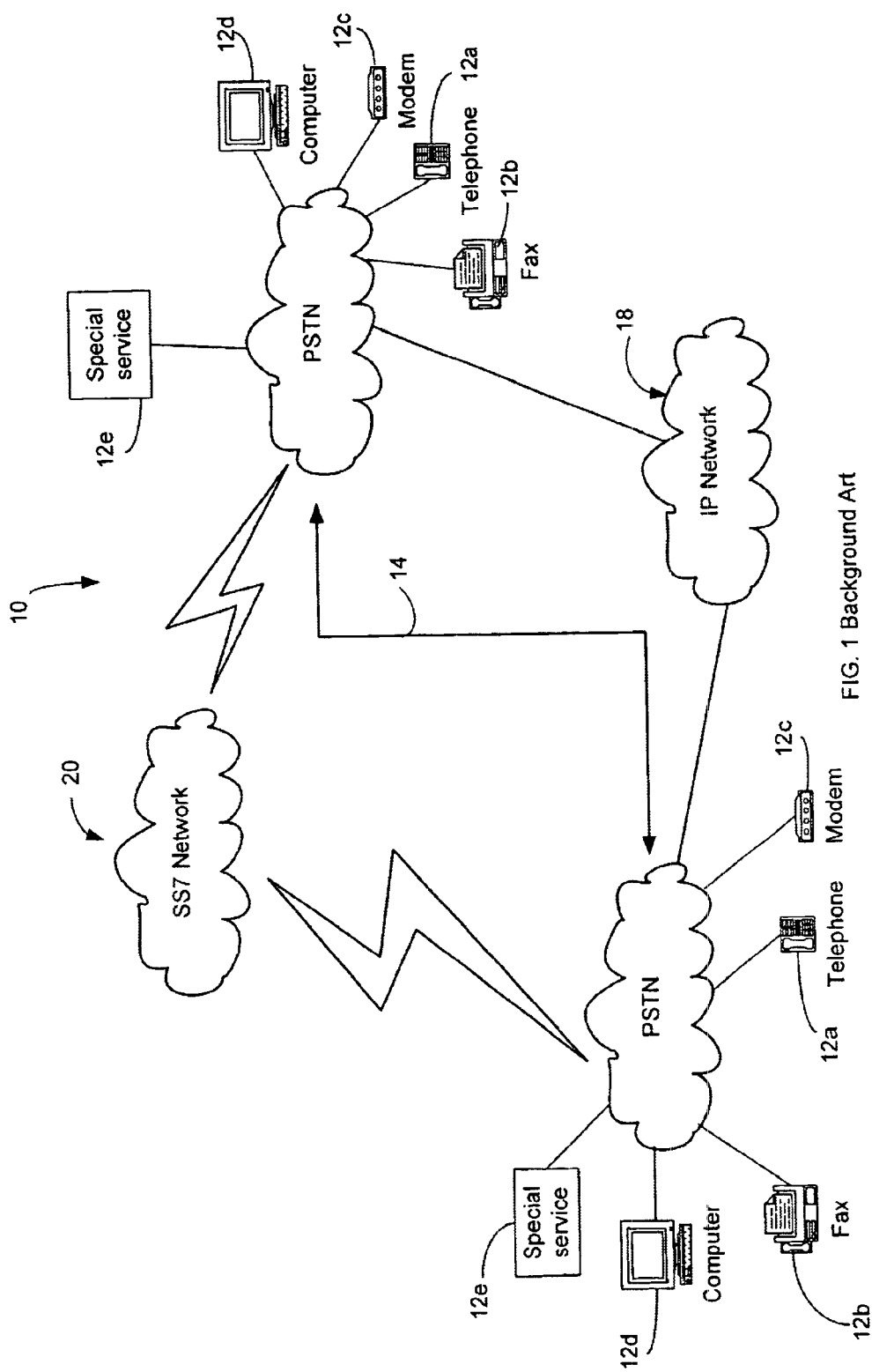
FIG. 1 (background art) is a block diagram depicting the existing infrastructure of the public switched telephone network (PSTN)
Figure 2:
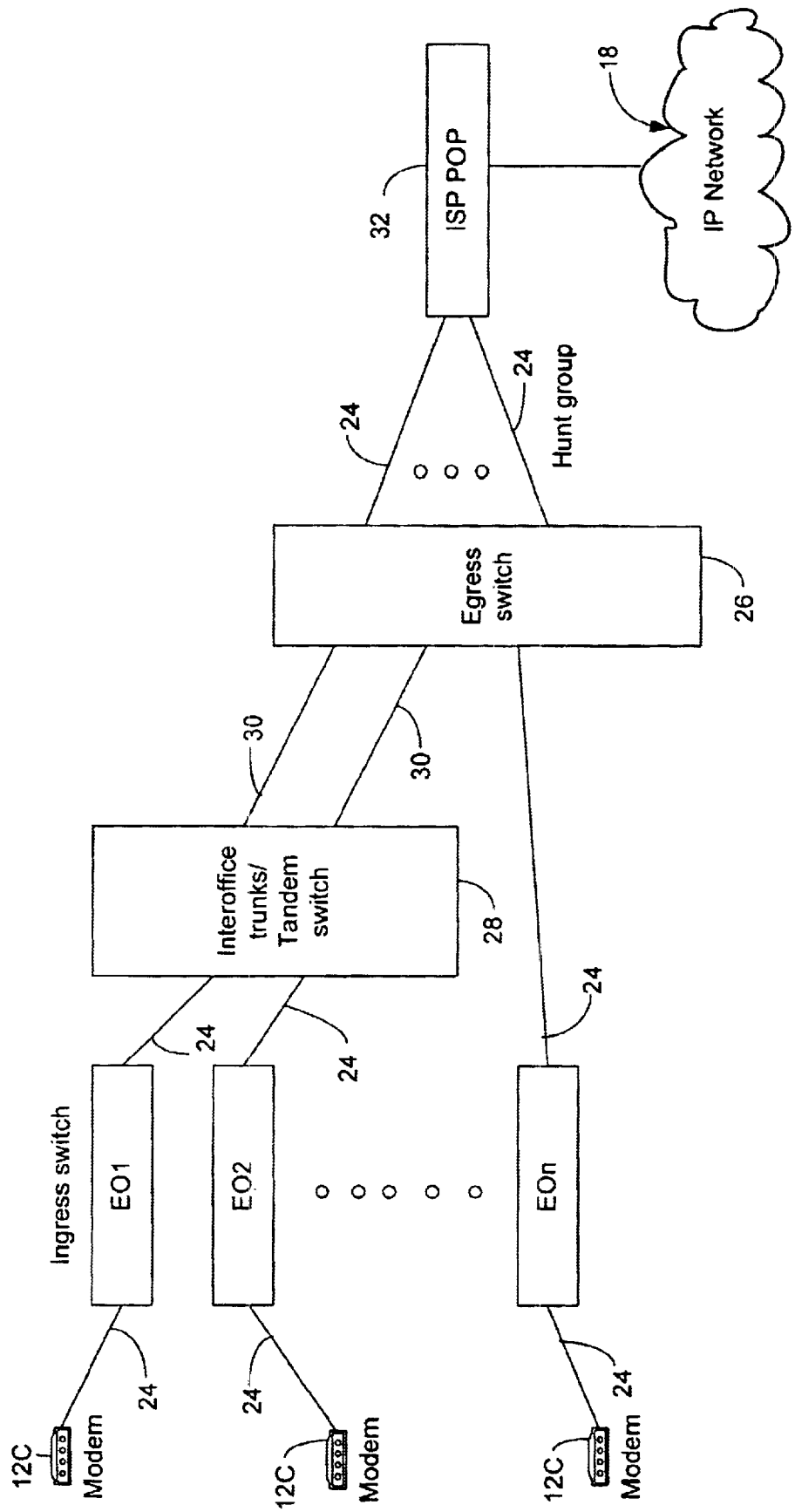
FIG. 2 (background art) is a block diagram depicting the most common digital, or "Internet call," connection methodology used today.

A preferred embodiment of the present invention is an improved architecture for communications via largely conventional telecommunications systems. As illustrated in the various drawings herein, and particularly in the view of FIG. 7, a form of this preferred embodiment of the inventive device is depicted by the general reference character 100.

As a brief summarizing introduction, the fundamental principle behind the bandwidth transfer switching system (BTSS 100) is integrating packet switching capabilities onto the efficient bit-framing techniques implemented in conventional T1/E1 circuit switching technology. This approach utilizes the transmission efficiencies of T1/E1 for circuit switching and adds on packet switching capabilities. This basic principle is then adapted to the local loop, where dynamic routing capabilities are not required. This results in a simplified switching system, the BTSS 100, which provides both circuit switching and packet switching capabilities in the local loop while maintaining compatibility with the external interfaces outside the local loop.

Figure 7:
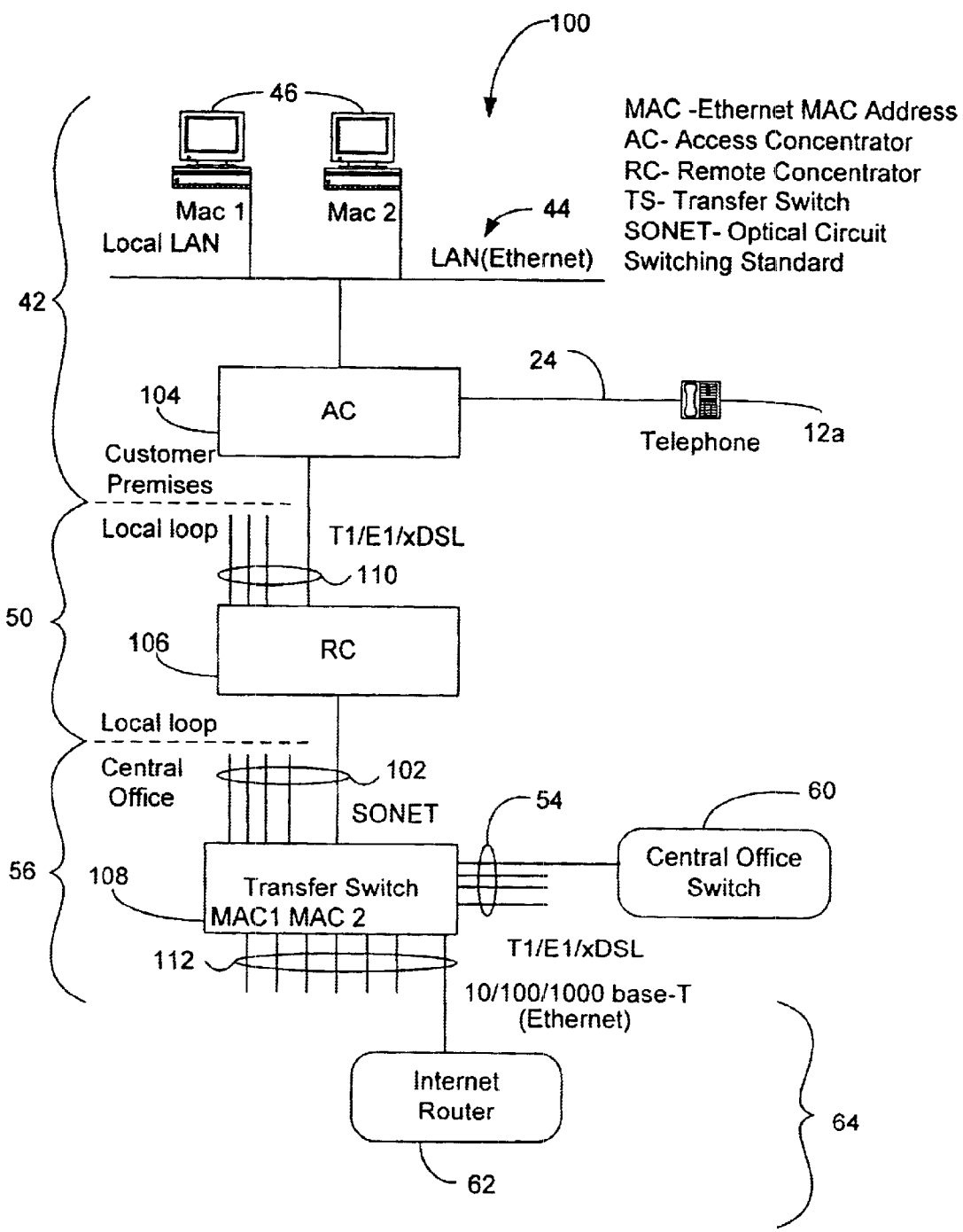
FIG. 7 is a block diagram of a transfer switch access architecture according to the present invention.

In FIG. 7 the BTSS 100 according to the present invention provides an architecture which may include older types of conventional communications as well as high bandwidth network communications. It permits implementation of efficient heterogeneous networks consisting of both circuit and packet switched technologies in public telephone switching systems. In contrast to the approach of developing entirely new technologies previously discussed in the Background Art section, the BTSS 100 uses time-proven T1/E1/DSx lines 54 (or xDSL, with little modification) from the customer premises 42 into the local loop 50 and then uses SONET 102 (SONET is an optical circuit standard employing fiber-optic cables) to carry the data to the central office 56. Even though the SONET 102 connection is shown as a single link, it will be implemented generally as a fiber optic ring.

Implementation of this architecture requires three new devices: an access concentrator 104, a remote concentrator 106, and a transfer switch 108. Between these new devices, the BTSS 100 employs two communication channels, one for control and management functions and the other for transferring application packets under HDLC framing, wherein the application packets being framed may include Ethernet, TCP/IP, video streams, voice over IP, alarm signaling, meter polling, etc.

To eliminate current bandwidth bottlenecks in both the local loop 50 and the central office 56, and also to provide deployment flexibility and increased network efficiency, the BTSS 100 bifurcates packet switch traffic and circuit switch traffic at the earliest access point outside of the customer premises 42. In this manner, different network architectures, technologies, and deployment strategies can be used in the implementation of data, voice, video, and other services; allowing optimization of specialized networks for different data types. Such specialized network access at the central office 56 is becoming increasingly important. For example, as WAN 64 access to services like the Internet grows. In the following discussion conventional telephone type circuit switch traffic and Internet type packet traffic are used in examples, and the details are thus sometimes specific to these, but the same model can be readily extended and applied to other protocols as well.

A key benefit of the BTSS 100 is enhancement of established network architectures and technologies, such as existing public telephone switching systems, for both circuit switching and packet switching. The BTSS 100 handles circuit switched traffic in substantially the same manner as is currently used (discussed further below), but packet data is handled differently.

Frequently it is desirable for application packet data which originates on an Ethernet local area network LAN 44 (i.e., a "local-LAN") to be routed to a WAN 64, either for some purpose on the WAN 64 itself or from the WAN 64 onward to another LAN 44 (i.e., a "remote-LAN"). For example, the originating LAN 44 may be a customer premises 42 that is accessing an ISP's network (essentially a simple LAN 44 to WAN 64 and back again situation, which is the example portrayed in FIG. 7), or the packet data may be intended to travel from a first LAN 44 at one customer premises 42 via the WAN 64 onward to a second LAN 44 at a second customer premises 42.

The BTSS 100 accomplishes essentially the same result as the prior art, LAN/WAN or local-LAN/WAN/remote-LAN communications, but it does so differently. Except for spoofing, only physical layer and/or link layer devices (layers 1 and 2 of the ISO Network model) are implemented in the BTSS 100. Upon provisioning, a synchronous control channel (based on HDLC) is established between the access concentrator 104, the remote concentrator 106, and the transfer switch 108. Two types of packet channels are implemented in these special T1/E1/xDSL lines 110, in addition to dedicated circuit channels for voice. One for system control and management functions, and the other for carrying payload. This control channel thus carries provisioning, control, and management information. In particular, this control channel will be used to transparently present the MAC (Ethernet address) of network devices 46 on the LAN 44 via an interface 112 to a WAN 64 during provisioning (e.g., to an Internet router 62).

Once the BTSS 100 is provisioned correctly, the transfer switch 108 monitors the Ethernet traffic on the interface 112 and filters it based on media access control addresses (MAC addresses, i.e., Ethernet addresses), transferring traffic to appropriate remote concentrators 106 for transfer onward to appropriate access concentrators 104, which in turn deliver it onto the LAN 44 having the ultimate target network device 46. In a similar fashion, the access concentrator 104 monitors the LAN 44 traffic and filters it based on MAC addresses, then transfers appropriate traffic onward to the remote concentrator 106 for transfer still onward to the transfer switch 108. The transfer switch 108 then removes the framing and presents the traffic onto the interface 112, or appropriate other application networks, or to the central office switch 60.

Figure 5:
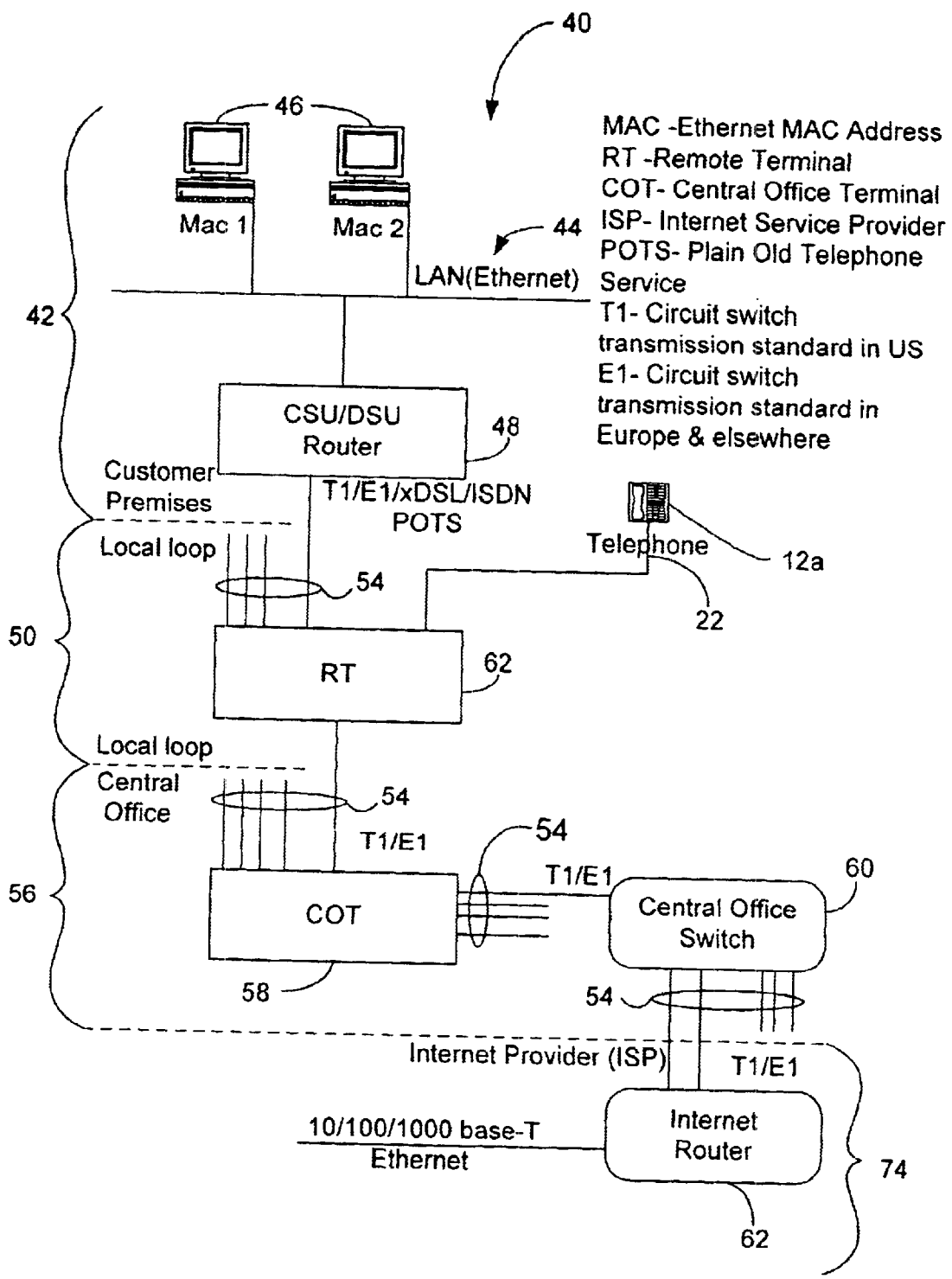
FIG. 5 (background art) is a block diagram of a conventional current digital loop carrier communications architecture.
Figures 6A, 6B:
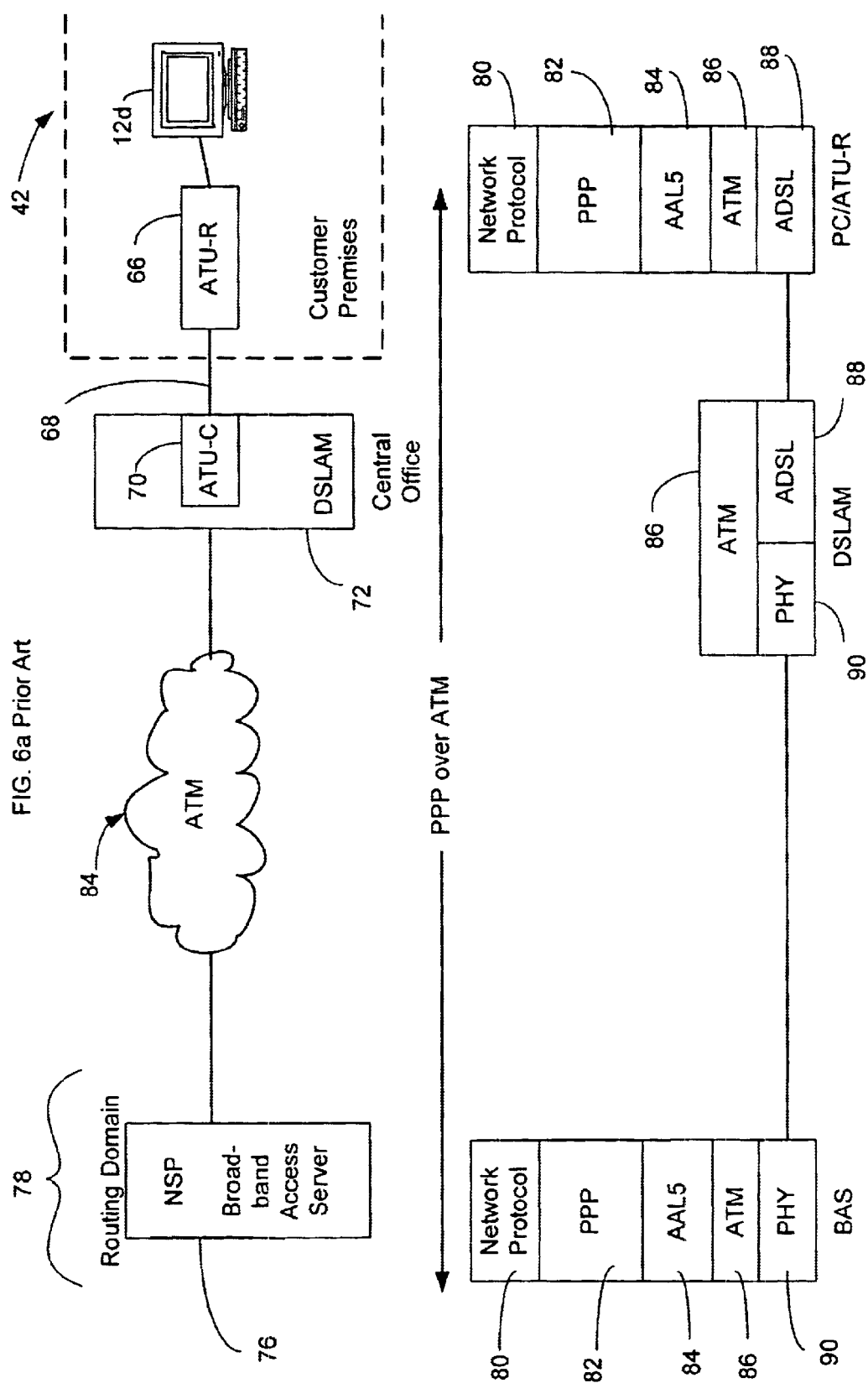

For traffic destined for the WAN 64, this can be done via either a direct transfer switch 108 to WAN 64 connection using the interface 112 shown in FIG. 7, or via a conventional T1/E1/DSx line 54, as shown in FIG. 5 (background art, but in this regard also usable by the BTSS 100). The "payload frames" in this scenario are application packets encapsulated inside an HDLC frame. This will require an access concentrator 104 at the terminating site. Only a single payload HDLC stream between a respective access concentrator 104 and transfer switch 108 is necessary, but redundancy can be provided as desired. The channels available in the T1/E1/DSx line 54 are assigned at provisioning time to specific voice service connections assigned to a subscriber at a customer premises 42. However, every available channel in the T1/E1/DSx line 54 need not be dedicated for service to a particular customer premises 42. Concentration techniques, wherein larger number of subscribers than available channels in T1/E1/DSx lines 54, may also be employed.

The data transfer between a LAN 44 and a WAN 64 only needs to be performed for actual data packets. The control packets can be filtered out by both the access concentrators 104 and transfer switches 108, with appropriate responses being generated as needed, and some traffic through the entire system thereby eliminated. Using the control channel in this manner, the access concentrators 104 are able to communicate with the transfer switches 108 so that the correct status of each network node can be maintained and so that control messages can be spoofed, with this spoofing done by both the access concentrators 104 and the transfer switches 108. Thus, a key point of the BTSS 100 is that "routing" in the traditional sense is not employed at stages between access concentrators 104 and transfer switches 108. The Internet router 62 on the WAN 64 and the network devices 46 on the LAN 44 effectively "see" each other as if they where connected on a simple network. In essence, the BTSS 100 implements a sub-network that has its own intelligence and traffic routing capability between applications and transferring networks.

As previously noted, the BTSS 100 handles analog traffic in essentially the same manner as is currently used. In order to support conventional "telephone" connections, the access concentrators 104 may include the ability to connect POTS lines 24 (and thus POTS devices). The analog traffic (e.g., voice, facsimile, and true modem) can then be either packetized and sent as voice over IP, or transferred using standard DS0 channels using fractional T1/E1, and sent into the local loop 50 on the special T1/E1/xDSL lines 110.

The access concentrators 104 can also provide other types of network connections (not shown), like security alarm and utility meter connections and similar appliance networking which requires only slow speed network access (not shown). These additional network services can also be carried over the local loop 50 and bifurcated at the transfer switch 108, onto appropriate networks providing these services. Services which require higher speeds (e.g., into broadband networks 36 (FIG. 4)), like video services such as Broadcast TV and Video On Demand, can also be similarly provided for in this architecture.

In summary, the approach using the BTSS 100 facilitates using widespread and large scale deployment of time-proven components of T1/E1/DSx technology, while also leveraging the efficiency and high bandwidth of the SONET 102 hierarchy to provide high bandwidth communications and to reduce costs on a per unit basis, compared to other methods in use today.

Figure 8:
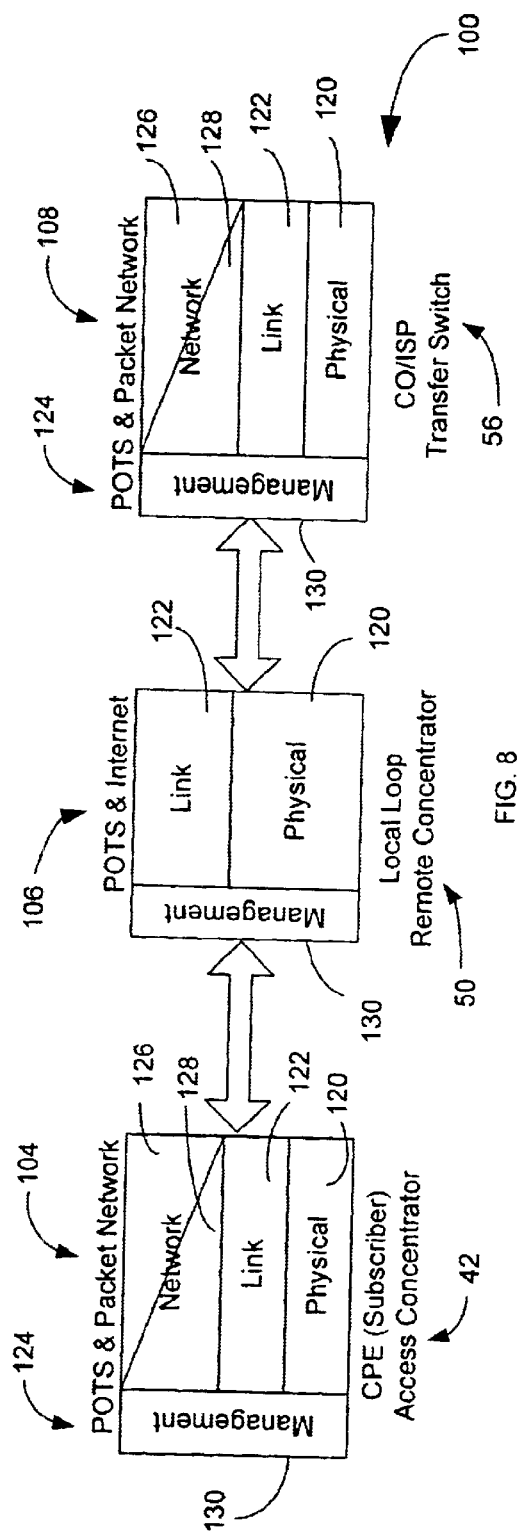
FIG. 8 is a block diagram depicting a general implementation of transfer node protocol layers for use within the present invention.

FIG. 8 is a block diagram depicting a general implementation of transfer node protocol layers for use within the BTSS 100. The access concentrator 104, in the customer premises 42; the remote concentrator 106, in the local loop 50; and the transfer switch 108, in the central office 56, are all connected with respective physical layers 120. These physical layers 120 in turn connect to respective link layers 122. In the access concentrator 104 and the remote concentrator 106 the link layers 122 in turn connect to network layers 124 which each include a POTS sub-layer 126 and packet sub-layer 128. Finally, the access concentrator 104, the remote concentrator 106, and the transfer switch 108 all include a management layer 130.

The BTSS 100 maintains compatibility with the existing infrastructure 10 (FIG. 1) of the PSTN completely. With reference again to FIG. 5, in addition to taking into account the requirements of the local loop 50 and eliminating network protocol components which are not required there, the BTSS 100 provides inherent economic advantages over competing high-speed WAN 64 access solutions. Viewed from this perspective, the BTSS 100 needs to provide bridge functionality between three major device categories, namely: the customer premises equipment (CPE 48), the central office switches 60 (e.g., class 5 switches), and carrier class IP routers (e.g., Internet router 62). The external interface for the customer premises equipment (CPE 48) typically includes POTS, RJ-11, RJ-45, and ethernet protocols. The external interface for the central office switches 60 typically includes POTS, T1/E1, DSx, SLC-96, GR-303, and SONET protocols. And the external interface for the Internet router 62 is some version of ethernet.

Figure 9:
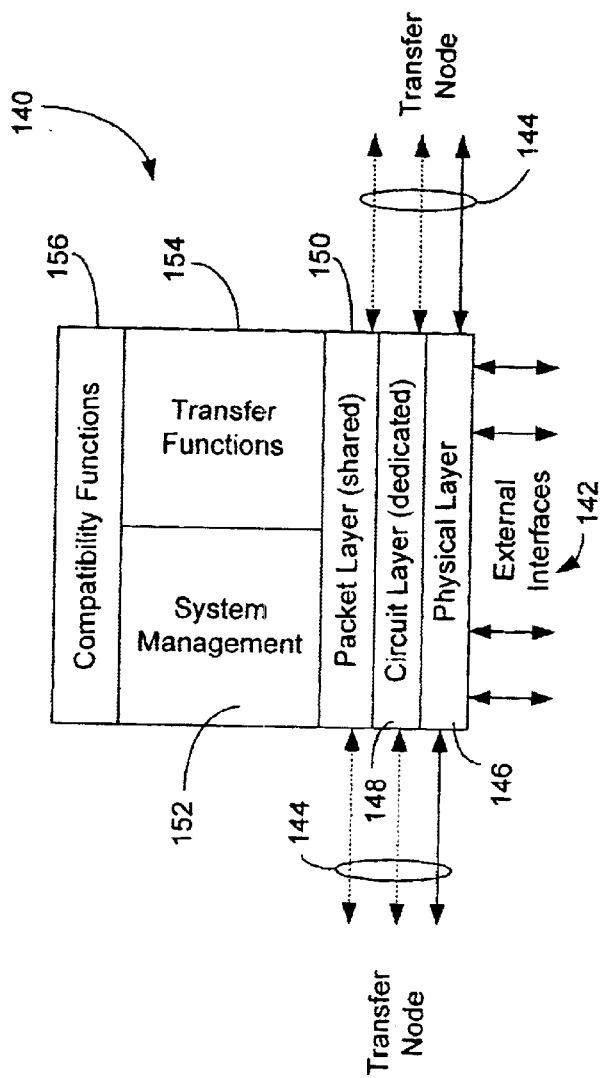
FIG. 9 is a block diagram depicting a more specific implementation of transfer node protocol layers for use within the present invention.

FIG. 9 is a block diagram depicting a more specific implementation of protocol layers in a transfer node 140 for use within the BTSS 100, one which particularly takes into account compatibility functionalities required for interfacing at appropriate external interfaces 142. The transfer node 140 connects to other transfer nodes 140 within the BTSS 100 via one or more internal interfaces 144. A physical layer 146 handles traffic into and out of the internal interfaces 144. The physical layer 146 includes a dedicated circuit sub-layer 148 and a shared packet sub-layer 150. A system management layer 152 or a transfer function layer 154, as appropriate for the respective tasks of management and data transfer, controls the physical layer 146. Finally, a compatibility functions layer 156 "resides" atop all of this and handles traffic into and out of the external interfaces 142.

Figure 3:
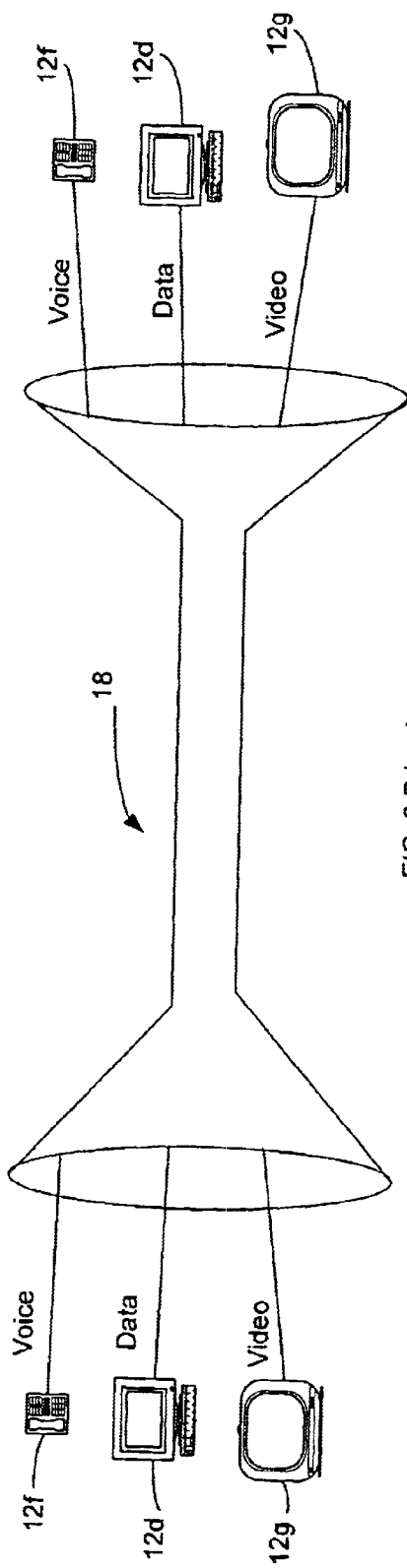
FIG. 3 (prior art) is a block diagram depicting the presently popular network evolution model, wherein the Internet protocol network evolves to become a single common packet backbone for all communications.
Figure 4:
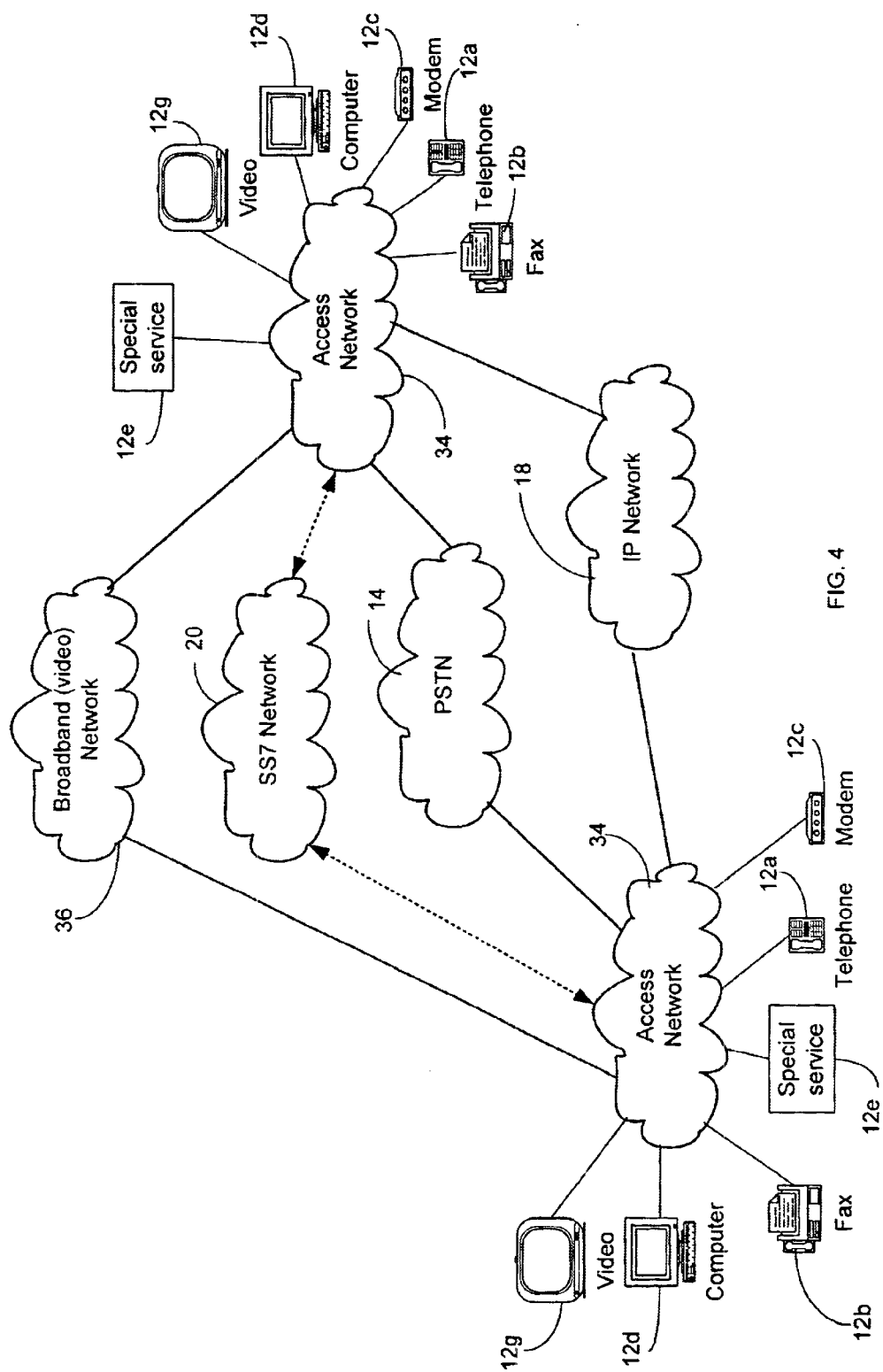
FIG. 4 is a block diagram depicting a proposed more suitable network evolution model.

The "generic" transfer node 140 of FIG. 9 may be any one of five different more specific types. One is a customer premises equipment type terminating node, such as an access concentrator 104, which connects to the user's various communications devices (12a–g) (FIGS. 1 and 3–4). A second is a central office type central node, such as the transfer switch 108, which connects to the central office switches 60 (e.g., class 5 switches). A third is an ISP type central node, again such as the transfer switch 108, but which connects to carrier class IP routers (e.g., Internet router 62). A fourth is a distributer type node, such as the remote concentrator 106, which connects only to other nodes of other types. Finally, a fifth is a relay type node which also connects only to other nodes, but not necessarily nodes of other types. The second and third of these, the central office and ISP types, may be implemented in one transfer switch 108 if both communication categories are needed, but this is not a requirement. The distributor and relay type notes do not not have any external interfaces 142 or any layers above the packet sub-layer 150. The relay type notes are included here for completeness, and are discussed in detail presently.

A key principle behind the BTSS 100 is combining circuit switching and packet switching in ways which enhance network capabilities in the local loop 50 (FIG. 7), but with reduced complexity. The functionality is independent of the physical layer connection, and may use the various xDSL technologies, coax, or even wireless to provide physical connectivity. On the physical layer 146, a logical DS1 (T1/E1) scheme may be implemented. This DS1 scheme may provide compatibility with existing OSS (Operations Support Systems). A high-speed Internet service offered with the BTSS 100 can then be managed as a "Consumer DS1" with existing support systems. Some key functions where the DS1 features will be used are service provisioning, alarm detection, monitoring, and propagation. The data rate on the consumer DS1 will vary depending on the particular physical layer 146 which is used.

Figure 10:
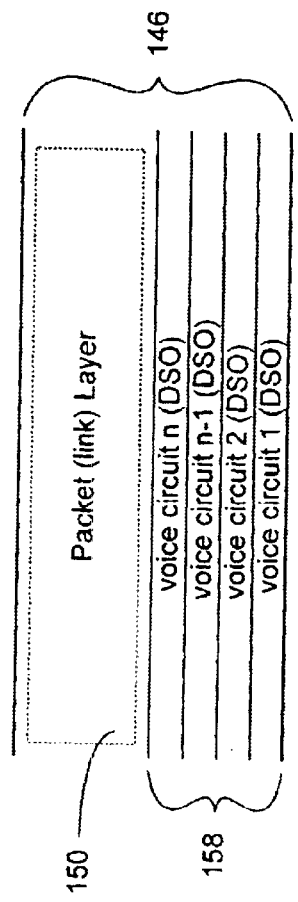
FIG. 10 is a block diagram depicting the circuit sub-layer and packet sub-layer bandwidth allocation within the physical layer of the present invention.

FIG. 10 is a block diagram depicting the bandwidth allocation within the circuit sub-layer 148 and the packet sub-layer 150 of the physical layer 146. The bandwidth of the physical layer 146 is split into dedicated DS0 channels 158 (e.g., 64 kbps each) for voice and other analog data connections. Each subscriber connection may consist of one or more dedicated DS0 channels 158, and optionally a common channel for the packet sub-layer 150 if data services are enabled. After providing for the dedicated DS0 channels 158, all remaining bandwidth may be used in a single packet sub-layer 150 which may implement a HDLC framed link layer. This may use 16-bit address field and HDLC framing wherein the address field is used to implement multiple logical links, including a control link for implementing management functions.

In this manner, the BTSS 100 may increase efficiency and simplicity by eliminating all dynamic routing requirements between the various transfer nodes 140. Voice calls are carried over the dedicated DS0 channels 158 using standard schemes for implementing voice connections. The assignment of the DS0 channels 158 is done at service provisioning, and for data services (e.g., Internet connection) a logical link is provisioned across all connecting transfer nodes 140, with a unique link layer address for each connecting segment. The available bandwidth in the packet sub-layer 150 is then shared among all the data connections serviced by the segment. Priority schemes may be implemented to provide varying levels of service. The control link used for system management typically will be implemented as a priority link between the transfer nodes 140.

Figure 11:
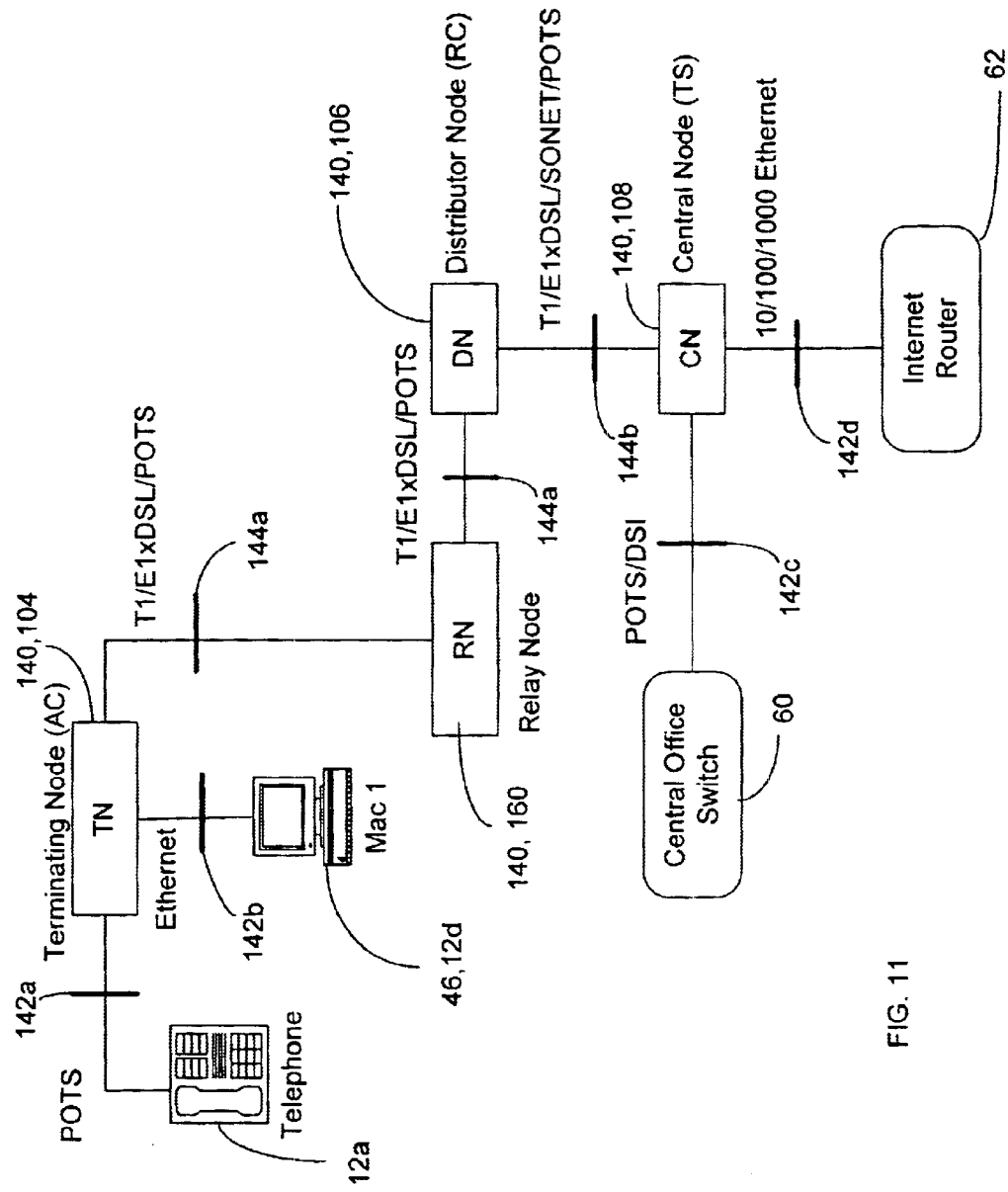
FIG. 11 is a block diagram depicting the external interfaces of transfer nodes within the present invention.

FIG. 11 is a block diagram summarizing typical interfaces in the BTSS 100, and particularly possible ones between the various transfer nodes 140. The transfer nodes 140 include the access concentrator 104 (a terminating node or TN), the remote concentrator 106 (a distributing note or DN), and the transfer switch 108 (a central node or CN). Also included, but not previously described in detail, is a relay node 160 (RN).

An analog user device, specifically the telephone 12a shown, is connected to an access concentrator 104 via an external interface 142a (such as the POTS connection shown). A digital user device, specifically the computer 12d, i.e., a network device 46, is connected to the access concentrator 104 via another external interface 142b (such as the Ethernet connection shown).

The access concentrator 104 is connected to the relay node 160 via an internal interface 144a, and the relay node 160 is connected to the remote concentrator 106 via another internal interface 144a (both shown here as possibly being any of T1, E1, xDSL, or POTS). The remote concentrator 106 connects to the transfer switch 108 via another internal interface 144b (shown here as possibly being any of T1, E1, xDSL, POTS, or SONET; i.e., adding SONET, which is preferred).

The remote concentrator 106 is connected to the central office switch 60 via an external interface 142c (shown here as being either POTS or DS1), and the remote concentrator 106 is also connected to an Internet router 62 via another external interface 142d (shown here as being Ethernet, but with higher speed versions preferred).

The relay node 160 is optional, but may be used when signals are transmitted long distances or need to be enhanced due to electronically "noisy" environments. For example, almost all protocols have some usable distance limitation, with xDSL being particularly notable in this respect.

Figure 12A:
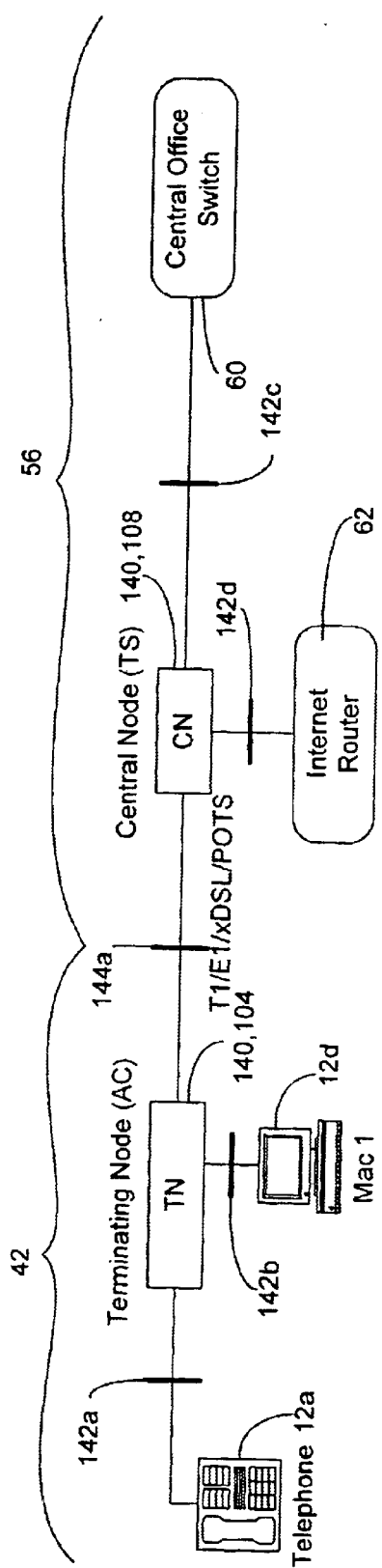
Figure 12B:
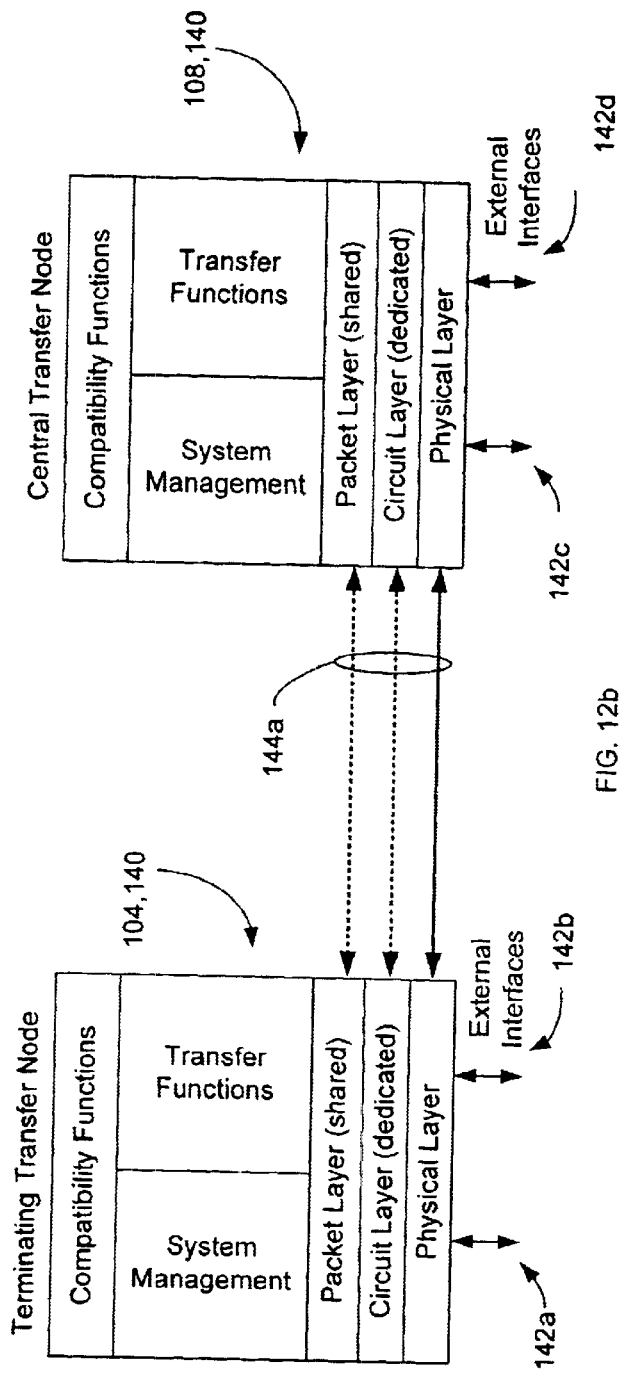
Figure 13A:
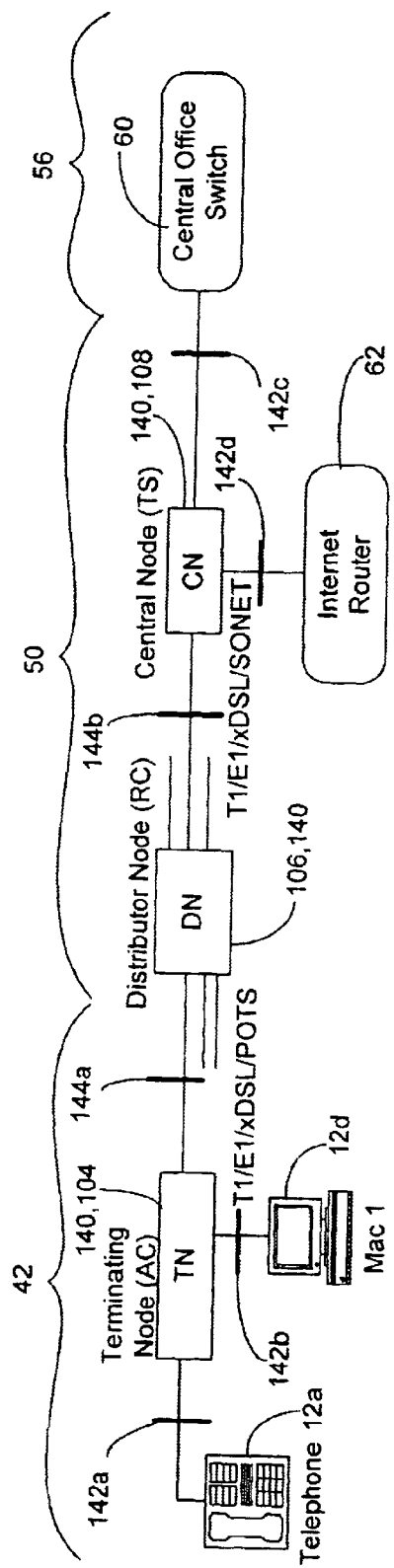
Figure 13B:
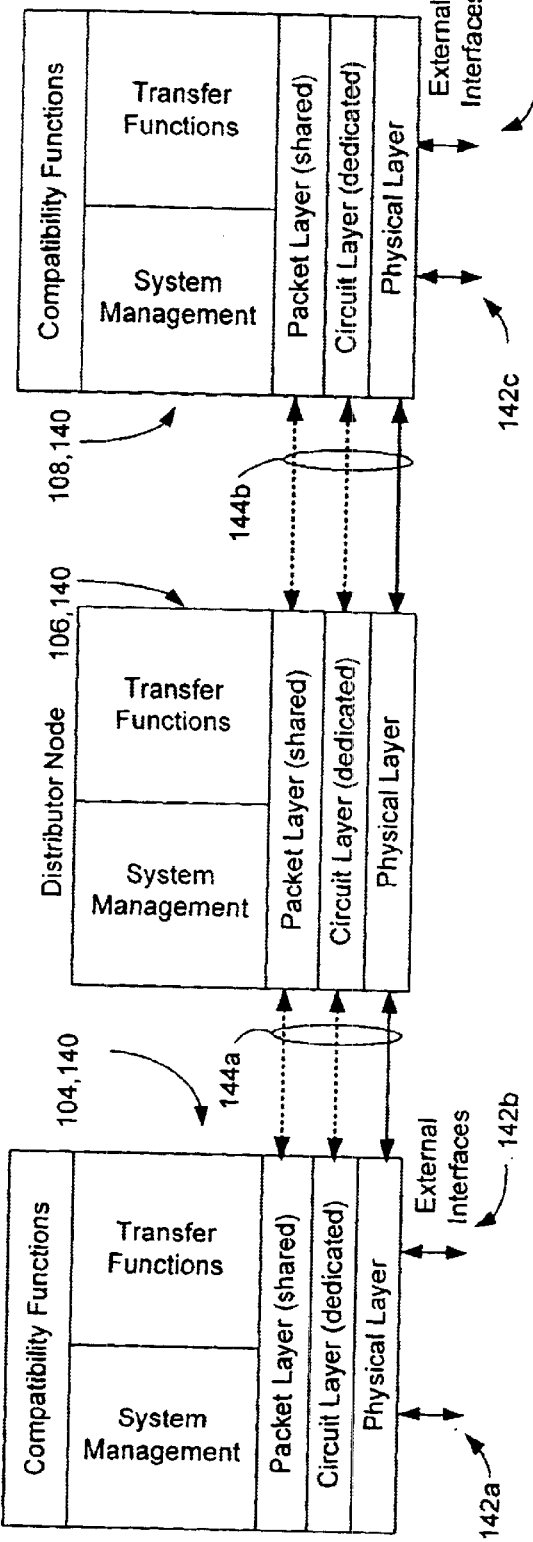
Figure 14A:
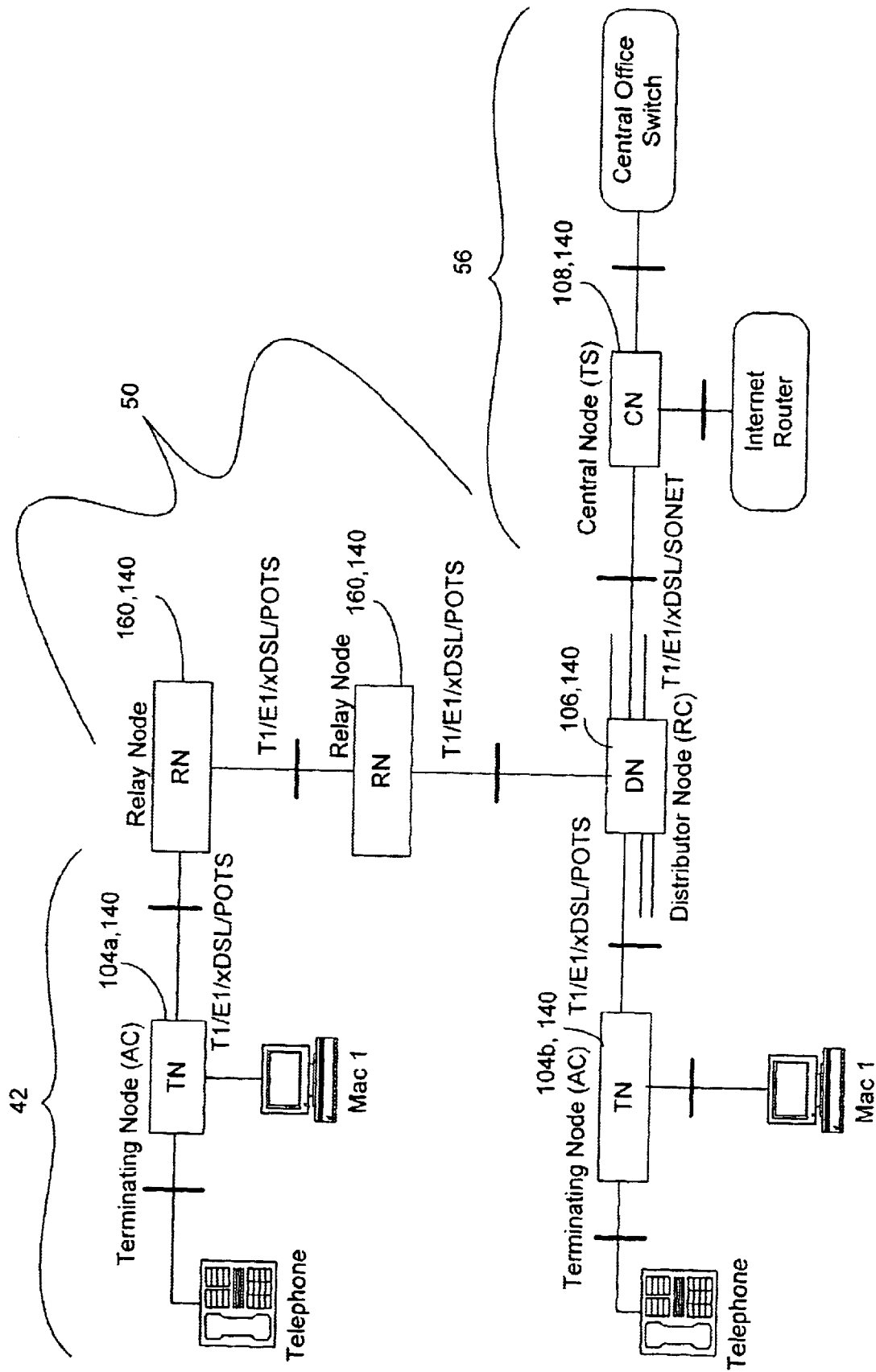
Figure 14B:
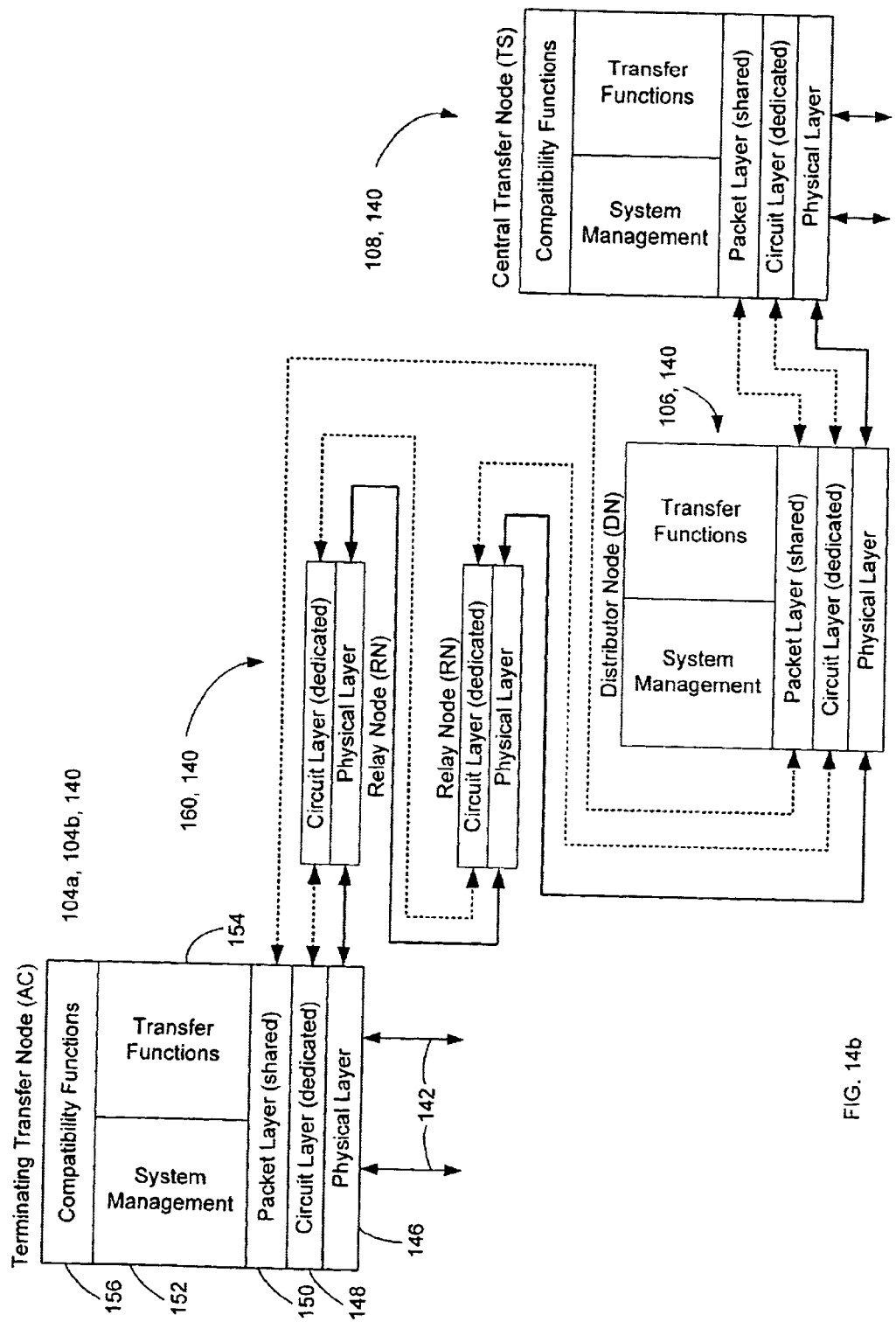

There are several possible deployment configurations for implementation of the BTSS 100 based on different network topology. FIGS. 12a–b show deployment in a typical metropolitan area, where the distance between a central office 56 and a customer premises 42 is short; FIGS. 13a–b show deployment in a typical suburban area; and FIGS. 14a–b show deployment in a typical rural area, where the distance between the central office 56 and the customer premises 42 is considerable and signal regeneration is required.

FIG. 12a is a schematic block diagram showing equipment location for deployment in a typical metropolitan area.

The distance between the access concentrator 104 at the customer premises 42 and the transfer switch 108 in the central office 56 is short. This permits elimination of the remote concentrator 106 and any relay nodes 160 (see e.g., FIGS. 11, 13a and 14a).

FIG. 12b is a schematic block diagram showing layer arrangement in the various transfer nodes 140 used in FIG. 12a. As can be seen, both the access concentrator 104 and the transfer switch 108 may have essentially the same layers (122, 124, 126, 128 and 130).

FIG. 13a is a schematic block diagram showing equipment location for deployment in a typical suburban area. Here the distance between the access concentrators 104 at customer premises 42, which may be numerous and more distributed, and the transfer switch 108 in the central office 56 is greater than in the metropolitan area of FIG. 13a. A remote concentrator 106 is therefore provided in this implementation.

FIG. 13b is a schematic block diagram showing layer arrangement in the various transfer nodes 140 used in FIG. 13a. As can be seen, both the access concentrator 104 and the transfer switch 108 may have essentially the same layers (146, 148, 150, 152, 154 and 156), but the remote concentrator 106 does not have a compatibility functions layer 156 or any external interfaces 142.

FIG. 14a is a schematic block diagram showing equipment location for deployment in a typical rural area. Here the distance between a first access concentrator 104a at a first customer premises 42 and the remote concentrator 106 is considerable. Two relay nodes 160 are therefore added between the first access concentrators 104 and the remote concentrator 106. This is particularly useful for protocols like xDSL, which are severely distance limited. In contrast, a closer second (third etc.) access concentrator 104b may directly connect to the remote concentrator 106, as shown.

FIG. 14b is a schematic block diagram showing layer arrangement in the various transfer nodes 140 used in FIG. 14a. As can be seen here, the access concentrators (104a, 104b) and the transfer switch 108 may have essentially the same layers (146, 148, 150, 152, 154 and 156), the remote concentrator 106 lacks a compatibility functions layer 156 and external interfaces 142; and the relay nodes 160 have only physical layers 146 and circuit sub-layers 148. In this case, the relay nodes 160 may implement the physical layers 146 and circuit sub-layers 148 using the bit frames and embedded control channels implemented as in regular T1/E1 interfaces. The embedded control channel may support alarm monitoring, detection, and propagation from the access concentrators (104a, 104b) to the transfer switch 108. The relay nodes 160 thus allow extending the distances over which service can be provided, potentially without any limit.

The BTSS 100 can be particularly useful in reducing the current IP address shortage, in enhancing network security, providing unified directory services, and handling additional number services.

Returning to FIG. 7, it can be seen there that the access concentrator 104, remote concentrator 106, and transfer switch 108 form a hierarchical boundary in a given service area. This can be highly useful to reduce the current IP address shortage. At the first level, the access concentrator 104 provides connectivity to a LAN 44 at the customer premises 42. This LAN 44 can be implemented either as a "closed network" or "open network." If it is desirable to provide open access to all of the systems at the customer premises 42 from the outside, then a way to provide addressing is to use globally unique IP addresses (RFC 1918, BCP 5) which are routable across the WAN 64, e.g., the Internet. But if such systems are meant to have limited access then a way to provide addressing is to use the non-routable private IP addresses. The remote concentrator 106 and the transfer switch 108 form logical network access control points to and from the outside service area covered by each remote concentrator 106 or transfer switch 108. By providing private IP addresses as the default addressing scheme for networks crossing the local loop 50, the BTSS 100 technology, if widely deployed, can drastically reduce the need for unique IP addresses. Since all the transfer nodes 140 (FIG. 11) are non-routing with respect to customer data, this implementation is independent of user devices addressing schemes. Implementing Network Address Translation (NAT) along with private IP address thus allows for significantly reducing the current IP address shortage.

The BTSS 100 also facilitates providing heightened network security and privacy. By implementing a NAT (Network Address Translation) on a central transfer switch 108, each subscriber may be provided an isolated LAN 44 with built-in security. Enhanced security features such as proxy servers can be implemented on the transfer switch 108 for added security needs. The remote concentrator 106 and the transfer switch 108 becomes a natural network access point for implementing the various protection and access control techniques available for implementing network security and privacy features. In addition, the access concentrator 104, remote concentrator 106, and transfer switch 108 form network access control points. This allows implementation of uniform network access control methods for varying levels of security needs. Since these devices are on the outer perimeter of any connected networks, e.g., the LAN 44 and WAN 64, the security capabilities implemented can enhance any additional security measures implemented within such connected networks. In addition, being on the outer perimeter of such connected networks, the transfer nodes 140 are capable of implementing network isolation, intrusion detection, and firewall schemes as fundamental functions.

As the various ways we use to communicate increases, providing unified directory services becomes increasingly desirable. Telephone companies have long implemented universal and easily accessible systems for distributing subscriber information, e.g., phone numbers, directory assistance, etc. These telephone numbering plans and the associated directory services provide a comprehensive set of tools for making the PSTN 14 (FIG. 1) useful. With the public WANs 64, such as the Internet, becoming increasing commonplace, the need for similar directory services is becoming obvious. Currently, the domain names and e-mail addresses used are being distributed or published in an ad hoc manner, and thus lack the universal reach and uniformity available with telephone directory-type methods. However, by linking a customer telephone to all such WAN (particularly Internet) related identification information, a customer who wishes to publish (privately or publicly) can simplify or avoid the current problems relating to the dissemination of their identification information. Appropriate embodiments of the access concentrator 104 can enable the customers to configure the selected identification information to be associated with their telephone number. Appropriate embodiments of the transfer switch 108 can then make this information available to the telephone operations systems, making it available as additional information available about the customer. The information thus provided can either be manually retrieved, e.g., via conventional operator assistance techniques, or the transfer nodes 140 can use the telephone number as a key identifier to provide directory lookup services.

Similarly, as the various services we use to communicate increases, the quantity of dedicated additional telephone numbers we require for such is becoming unwieldy. However, in the BTSS 100, the terminal transfer nodes 140 can provide more than one POTS connection on each customer line. This permits providing additional telephone lines, such as dedicated ones for fax and pager services, but without the need for dedicated telephone numbers. While having dedicated circuits assigned for each specific type of service (fax, pager, second line, etc.), under the BTSS 100 there is no need to provide separate numbers for each. The service type can be identified either at the access concentrator 104 or at the transfer switch 108. The PSTN 14 can route the call to the customer telephone number like any other call. And the terminal transfer nodes 140 can appropriately terminate the call based on its particular type. In this manner, the need for different telephone numbers for each different service may be eliminated. Large scale deployment of these capabilities can reduce the need for separate telephone numbers, thus reducing the current number shortage.

FIGS. 15a–d illustrate how the BTSS 100 permits enhancing and upgrading the local loop 50 in stages. Currently, the technology implemented in the local loop 50 addresses only voice service needs. Providing the next generations of services requires enhancing and upgrading the local loop to offering voice, data, and video services. This is a huge effort in terms of time and resources, and the only practical way to achieve such enhanced capabilities is by implementing them in stages. FIGS. 15a–d show how this upgrade and enhancement can be implemented in five steps. FIG. 15a shows step 0 (the existing situation), wherein local loop 50 consists of customer equipment 162 at the customer premises 42, an end office unit 164 in the telco central office 56, and copper wire lines 166 connecting these. FIG. 15b shows a step 1, wherein the transfer nodes 140 are deployed in the local loop 50, but offering only POTS type services. FIG. 15c shows a step 2, wherein data (e.g., Internet) services are additionally offered by adding access concentrators 104. FIG. 15c also shows a step 3, wherein the bandwidth limitations in the local loop 50 are eliminated by deploying fiber optic lines 168 (e.g., SONET) between the central transfer nodes 140 (e.g., the remote concentrator 106 and transfer switch 108). Finally FIG. 15d shows a step 4, wherein additional remote concentrators 106 are deployed to provide high bandwidth services (e.g., HDTV, video) and for additional service selections which employ flexible and reconfigurable sub-networks in the local loop 50 using the network of transfer nodes 140.

The following is a simplified outline of the functions of the access concentrator 104: connection to POTS telephones; TCP/IP interface over Ethernet; T1/E1/xDSL interface to the remote concentrator 106; establish and manage the control channel to the transfer switch 108; optional dynamic channel allocation of the available bandwidth between packet and voice time division multiplexing (TDM) traffic, or voice over IP; conversion and transmission of Ethernet packets from the LAN 44 into HDLC framed packets to the transfer switch; conversion and transmission of remote HDLC packets from the transfer switch 108 to Ethernet packets in the LAN 44; managing and maintaining Ethernet MAC address conversion to and from HDLC addresses; spoofing network control packages addressed to all remote devices which are currently active (this requires partial IP level filtering and processing); compression and decompression of different data types; encryption of secure data and management and processing of digital certificates for authentication; and combination of different traffic types, e.g., analog, voice, video, data, etc., into data streams.

The following is a simplified outline of the functions of the remote concentrator 106: multiple T1/E1/xDSL interfaces to multiple access concentrators 104; DSx/xDSL/SONET interfaces to transfer switches 108 at the central offices 56; maintaining the control channel between the transfer switch 108 and the remote concentrators 106; and dropping and inserting T1/E1/xDSL interfaces from the access concentrators 104 into the SONET interfaces.

The following is a simplified outline of the functions of the transfer switch 108: maintaining multiple T1/E1/DSx interfaces from multiple remote concentrators 106; maintaining multiple 10/100/1000 base-T interfaces to Internet routers 62 (for data traffic); maintaining multiple T1/E1/DSx interfaces to central office switches 60 (for voice data); establishing and managing the control channels (through HDLC framed links) to access concentrators 104; accepting Ethernet MAC addresses from the access concentrators 104, and presenting them on the 10/100/1000 base-T interface to Internet routers 62; controlling and managing TDM voice calls to the access concentrators 104, alternatively providing voice over IP; spoofing network control packages addressed to all remote devices which are currently active (this requires partial IP level filtering and processing); compressing and decompressing different data types; encryption of secure data and management and processing of digital certificates for authentication; separating the data streams back into the original different traffic types, e.g., analog, voice, video, data, etc., for transfer to different application networks, e.g., central office switch 60, Internet router 62, alarm system, utility company meter polling, etc.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present bandwidth transfer switching system (BTSS 100) is well suited for application in upgrading the existing PSTN 14. As modern communications evolves from analog based systems to digital ones it is increasingly necessary to provide the capability to handle both analog and digital data types, or as these are commonly known, switched circuit and data packet communications traffic. While the eventual goal, arguably, is to arrive at an Internet protocol based system wherein only data packet is used, switching the existing PSTN 14 to an Internet protocol network (IP network 18) is simply not realistic. A transitional approach of constructing the IP network 18 in parallel with the existing PSTN 14 is also not practical. This has resulted in a piecemeal hybridizing approach wherein both switched circuit and data packet traffic are forced through at least part of the existing PSTNs 14, with the result that some segments of it are severely burdened.

The BTSS 100 permits an incremental approach to the problems of upgrading our communications infrastructure by providing access networks 34 to the customer premises 42 and then separating the traffic types early in the telco central office 56 or even in the remote concentrators 106 (i.e., the distributor nodes). It permits continued usage of the considerable existing investment in copper wire lines 166, and their gradual replacement with fiber optic lines 168 in key, high traffic volume, segments of the communications system.

In this manner, the BTSS 100 is able to effectively and economically integrate communications between telephones 12*a*, facsimiles 12*b*, modems 12*c*, computers 12*d*, special services devices 12*e* (e.g., alarm and utility metering systems), digital voice phones 12*f*, video units 12*g*, LANs 44, and WANs 64 (including the Internet). Furthermore, while doing this the BTSS 100 is also able to help in reducing peripheral communications problems like the current IP address shortage, network security and privacy, unifying directory services, and providing additional number services in our finite numbering schemes.

For the above, and other, reasons, it is expected that the BTSS 100 of the present invention will have widespread industrial applicability. Therefore, it is expected that the commercial utility of the present invention will be extensive and long lasting.

What is claimed is:

1. An improved communications system of the type in which:
   a public switched telephone network has communications devices of both circuit switched and packet transfer types at a plurality of customer premises which intercommunicate via at least one telco central office with communications devices of respective like types;
   the improvement comprising an access network including an access concentrator located at a first said customer premises, a remote concentrator located between said first said customer premises and a first said telco central office, and a transfer switch located at said first said telco central office;
   wherein said access concentrator is suitable for:
      accepting both switched signals from said circuit switched types of said communications devices and packet signals from said packet transfer types of said communications devices; and
      communicating both of said switched signals and said packet signals as a terminating node signal over a first internal interface to said remote concentrator;
   and wherein said remote concentrator is suitable for:
      accepting said terminating node signal from said access concentrator; and
      communicating said terminating node signal as a distributor node signal over a second internal interface to said transfer switch;
   and wherein said transfer switch is suitable for:
      accepting said distributor node signal from said remote concentrator;
      separating said switched signals from said distributor node signal for transmission onward to instances of said circuit switched types of said communications devices at another said customer premises than said first said customer premises; and
      separating said packet signals from said distributor node signal for routing onward to instances of said packet transfer types of said communications devices at another said customer premises than said first said customer premises.

2. The improved communications system of claim 1, wherein:
   said circuit switched types of said communications devices employ analog signal protocols; and
   said access concentrator includes at least one plain old telephone system interface, to receive said switched signals from said circuit switched types of said communications devices.

3. The improved communications system of claim 1, wherein:
   said circuit switched types of said communications devices include members of the set consisting of telephone devices, facsimile devices, modem devices, and special service signaling devices; and
   said access concentrator includes at least one plain old telephone system (POTS) interface, to receive said switched signals from said circuit switched types of said communications devices.

4. The improved communications system of claim 1, wherein:
   said packet transfer types of said communications devices employ ethernet signal protocols; and
   said access concentrator includes at least one ethernet interface, to receive said packet signals from said packet transfer types of said communications devices.

5. The improved communications system of claim 1, wherein:
   said packet transfer types of said communications devices include members of the set consisting of computers, computerized digital devices, digital network devices, digital video units, and digital audio units; and
   said access concentrator includes at least one digital network interface, to receive said packet signals from said packet transfer types of said communications devices.

6. The improved communications system of claim 1, wherein:
   said terminating node signal includes a circuit layer for said switched signals and a packet layer for said packet signal, wherein:
      said circuit layer is configured as dedicated to a set number of sub-circuits when said access network is initially provisioned and thereby able to accommodate a like said number of said switched signals; and
      said packet layer is dynamically shared and thereby able to include a quantity of said packet signal ranging from as few as none to as many as a plurality.

7. The improved communications system of claim 1, wherein said first internal interface employs a protocol which is a member of the set consisting of POTS, T1, E1, DSx, and xDSL.

8. The improved communications system of claim 1, wherein said second internal interface employs a protocol which is a member of the set consisting of POTS, T1, E1, DSx, SLC-96, GR-303, and SONET.

9. The improved communications system of claim 1, wherein:
   the telco central office includes a central office switch connecting to said instances of said circuit switched types of said communications devices at said another said customer premises than said first said customer premises;
   the telco central office includes a router connected to a digital network connecting to said instances of said packet transfer types of said communications devices at said another said customer premises than said first said customer premises; and
   said transfer switch includes:
      a first external interface connected to the central office switch, wherein said first external interface employs a protocol which is a member of the set consisting of T1, E1, and DSx to direct said switched signals into the central office switch; and a second external interface connected to the digital network, wherein said second external interface employs a digital network protocol.

10. The improved communications system of claim 9, wherein said digital network protocol is an ethernet protocol.

11. The improved communications system of claim 1, further comprising at least one relay node located between said access concentrator and said remote concentrator, to communicate said terminating node signal over longer distances between the customer premises and the telco central office.

12. A method for bandwidth transfer on a public telecommunications network wherein communications devices using switched signals and packet signals are located at a plurality of customer premises and intercommunicate via at least one telco central office, the method comprising the steps of:

(1) accepting at least one customer signal from the communications devices into an access concentrator, wherein each said customer signal is a member of the set consisting of the switched signals and the packet signals;

(2) integrating all said customer signals received at said access concentrator into a terminating node signal;

(3) communicating said terminating node signal to a remote concentrator across a first internal interface;

(4) accepting at least one said terminating node signal at said remote concentrator;

(5) integrating all said terminating node signals received at said remote concentrator into a distributor node signal;

(6) communicating said distributor node signal to a transfer switch across a second internal interface;

(7) accepting at least one said distributor node signal at said transfer switch;

(8) separating all said switched signals from said distributor node signal and transmitting said switched signals onward to instances of said circuit switched types of said communications devices at another said customer premises than said first said customer premises; and (9) separating all said packet signals from said distributor node signal and routing said packet signals onward to instances of said packet transfer types of said communications devices at another said customer premises than said first said customer premises.

13. The method of claim 12, wherein:

said customer signal is an instance of the switched signals; and said step (1) includes receiving said customer signal into a plain old telephone system interface.

14. The method of claim 12, wherein:

said customer signal is from a member of the set consisting of telephone devices, facsimile devices, modem devices, and special service signaling devices; and said step (1) includes receiving said customer signal into a plain old telephone system (POTS) interface.

15. The method of claim 12, wherein:

said customer signal is an instance of the packet signals; and said step (1) includes receiving said customer signal into an ethernet interface.

16. The method of claim 12, wherein:

said customer signal is from a member of the set consisting of computers, computerized digital devices, digital network devices, digital video units, and digital audio units; and said step (1) includes receiving said customer signal into a digital network interface.

17. The method of claim 12, wherein:

said terminating node signal includes a circuit layer for said switched signals and a packet layer for said packet signal, wherein:

said circuit layer is configured as dedicated to a set number of sub-circuits when said access network is initially provisioned and thereby able to accommodate a like said number of said switched signals; and said packet layer is dynamically shared and thereby able to include a quantity of said packet signal ranging from as few as none to as many as a plurality.

18. The method of claim 12, wherein said step (3) includes employing a protocol which is a member of the set consisting of POTS, T1, E1, DSx, and xDSL across said first internal interface.

19. The method of claim 12, wherein said step (6) includes employing a protocol which is a member of the set consisting of POTS, T1, E1, DSx, SLC-96, GR-303, and SONET across said second internal interface.

20. The method of claim 12, wherein:

the telco central office includes a central office switch connected to said instances of said circuit switched types of said communications devices at said another said customer premises than said first said customer premises;

the telco central office includes a router connected to said instances of said packet transfer types of said communications devices at said another said customer premises than said first said customer premises;

said step (8) includes transmitting said switched signals via said central office switch; and said step (9) includes routing said packet signals via said router.

21. The method of claim 20, wherein said step (9) further includes employing an ethernet protocol when routing said packet signals via said router.

22. The method of claim 12, further comprising passing said terminating node signal via at least one relay node located between said access concentrator and said remote concentrator, to communicate said terminating node signal over longer distances between the customer premises and the telco central office.

* * * * *